United States Patent
Wiemker et al.

(10) Patent No.: US 9,424,680 B2
(45) Date of Patent: Aug. 23, 2016

(54) IMAGE DATA REFORMATTING

(75) Inventors: Rafael Wiemker, Kisdorf (DE); Sven Kabus, Hamburg (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 653 days.

(21) Appl. No.: 13/639,189

(22) PCT Filed: Mar. 16, 2011

(86) PCT No.: PCT/IB2011/051107
§ 371 (c)(1),
(2), (4) Date: Oct. 3, 2012

(87) PCT Pub. No.: WO2011/128792
PCT Pub. Date: Oct. 20, 2011

(65) Prior Publication Data
US 2013/0064440 A1    Mar. 14, 2013

Related U.S. Application Data

(60) Provisional application No. 61/324,809, filed on Apr. 16, 2010.

(51) Int. Cl.
G06T 7/00     (2006.01)
G06T 15/08    (2011.01)

(52) U.S. Cl.
CPC ..................... *G06T 15/08* (2013.01)

(58) Field of Classification Search
CPC .................. G06K 7/0012; G06T 2207/10081
See application file for complete search history.

(56) References Cited

U.S. PATENT DOCUMENTS

| | | | | |
|---|---|---|---|---|
| 6,041,097 A | * | 3/2000 | Roos et al. | 378/62 |
| 6,211,674 B1 | * | 4/2001 | Cline | G01R 33/4833 324/307 |
| 6,352,509 B1 | * | 3/2002 | Kawagishi | A61B 8/06 128/916 |
| 6,416,476 B1 | * | 7/2002 | Ogasawara | A61B 8/466 600/425 |
| 6,697,663 B1 | * | 2/2004 | Lin | A61B 6/032 378/22 |
| 7,233,329 B2 | | 6/2007 | Moreau-Gobard | |
| 7,369,691 B2 | * | 5/2008 | Kondo | G06T 15/08 382/128 |

(Continued)

FOREIGN PATENT DOCUMENTS

| WO | PCT/IB 2007/053101 | * | 8/2006 | G06K 9/00 |
|---|---|---|---|---|
| WO | WO 2008018014 A2 | * | 2/2008 | |

OTHER PUBLICATIONS

Graves et al. "Constrained Surface Controllers for Three-dimensional Image Data Reformatting" radiology.rsnajnls.org • Radiology: vol. 252: No. 1—Jul. 2009 (pp. 1-7).*

(Continued)

*Primary Examiner* — Chan Park
*Assistant Examiner* — Mia M Thomas

(57) ABSTRACT

A method for reformatting image data includes obtaining volumetric image data indicative of an anatomical structure of interest, identifying a surface of interest of the anatomical structure of interest in the volumetric image data, identifying a thickness for a sub-volume of interest of the volumetric image data, shaping the sub-volume of interest such that at least one of its sides follows the surface of interest, and generating, via a processor, a maximum intensity projection (MIP) or direct volume rendering (DVR) based on the identified surface of interest and the shaped sub-volume of interest.

18 Claims, 5 Drawing Sheets

(56) References Cited

U.S. PATENT DOCUMENTS

Figure 1:
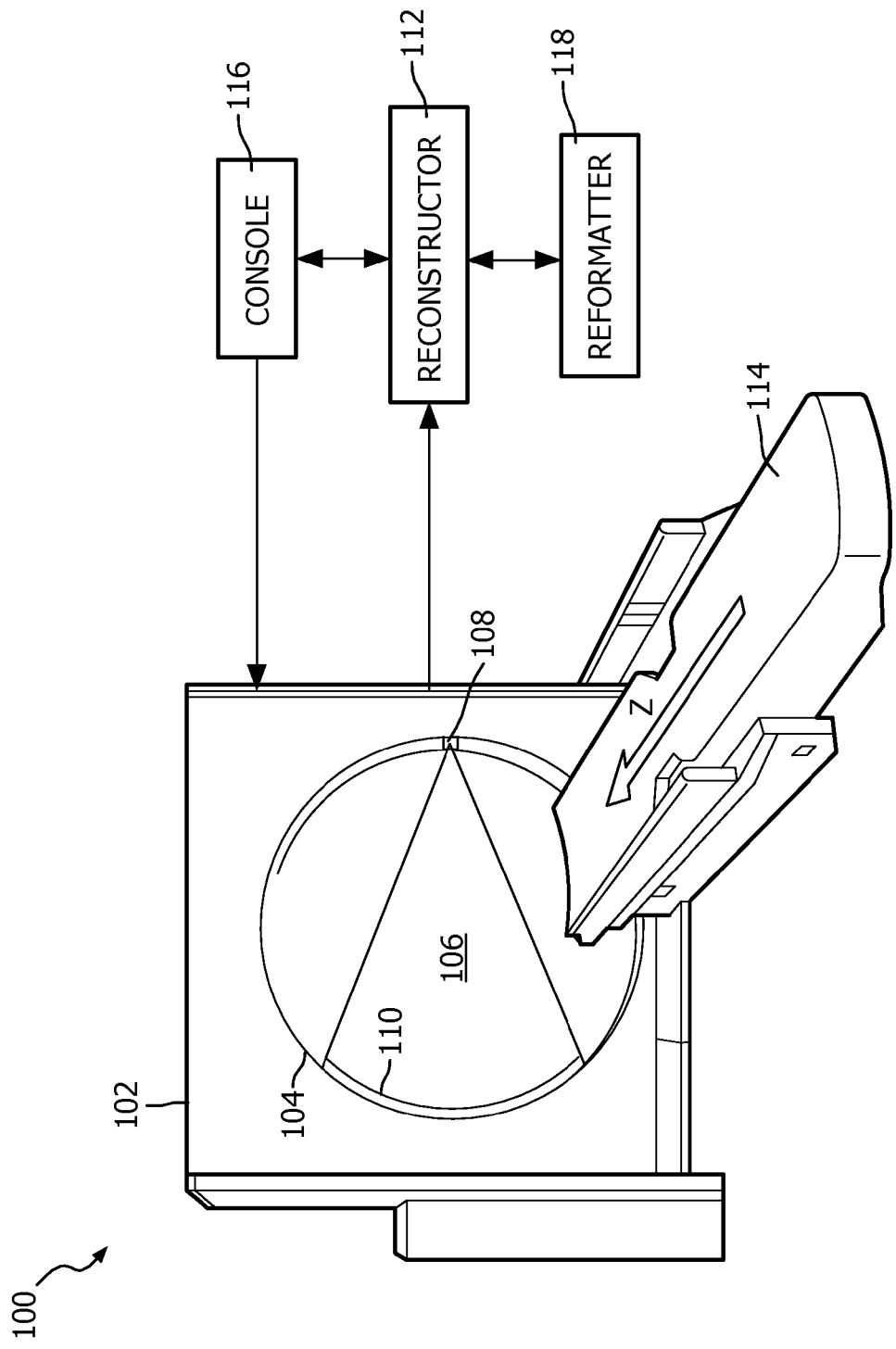

| | | | | |
|---|---|---|---|---|
| 7,532,214 B2* | 5/2009 | Lundstrom | | 345/424 |
| 7,574,247 B2 | 8/2009 | Moreau-Gobard | | |
| 7,609,902 B2* | 10/2009 | Verbeck | | H04N 19/60 |
| | | | | 375/240.2 |
| 7,616,801 B2* | 11/2009 | Gkanatsios | | A61B 6/025 |
| | | | | 378/23 |
| 7,660,461 B2* | 2/2010 | Lundstrom et al. | | 382/168 |
| 7,881,512 B2* | 2/2011 | Asbeck | | G06T 7/606 |
| | | | | 128/922 |
| 7,885,440 B2* | 2/2011 | Fram | | A61B 6/463 |
| | | | | 382/128 |
| 7,889,194 B2* | 2/2011 | Engel et al. | | 345/419 |
| 7,929,743 B2* | 4/2011 | Khorasani | | A61B 6/025 |
| | | | | 378/37 |
| RE43,225 E * | 3/2012 | Parker | | G06T 7/0081 |
| | | | | 348/79 |
| 8,463,007 B2* | 6/2013 | Steinberg | | G06T 7/0022 |
| | | | | 378/4 |
| 8,761,474 B2* | 6/2014 | Yu | | G06T 7/0016 |
| | | | | 382/128 |
| 8,879,807 B2* | 11/2014 | Fram | | A61B 6/463 |
| | | | | 382/128 |
| 8,994,720 B2* | 3/2015 | Masumoto | | G06T 19/00 |
| | | | | 345/419 |
| 9,070,181 B2* | 6/2015 | Wu | | G06T 7/0012 |
| 9,117,141 B2* | 8/2015 | Kelly | | G06T 7/0012 |
| 2003/0062416 A1* | 4/2003 | Smith | | G06K 7/10722 |
| | | | | 235/462.01 |
| 2004/0070584 A1* | 4/2004 | Pyo et al. | | 345/419 |
| 2004/0161144 A1* | 8/2004 | Barth | | 382/154 |
| 2004/0249270 A1* | 12/2004 | Kondo | | G06T 15/08 |
| | | | | 600/425 |
| 2005/0093861 A1* | 5/2005 | Moreau-Gobard | | 345/419 |
| 2005/0099416 A1* | 5/2005 | Moreau-Gobard | ... | G06T 7/0012 |
| | | | | 345/419 |
| 2005/0105786 A1* | 5/2005 | Moreau-Gobard et al. | .. | 382/128 |
| 2005/0135557 A1* | 6/2005 | Hermann Claus | | A61B 6/00 |
| | | | | 378/21 |
| 2005/0195189 A1* | 9/2005 | Raman et al. | | 345/424 |
| 2006/0034511 A1* | 2/2006 | Verstraelen et al. | | 382/173 |
| 2006/0181551 A1* | 8/2006 | Matsumoto | | 345/679 |
| 2006/0222142 A1* | 10/2006 | Kudo | | 378/4 |
| 2006/0228015 A1* | 10/2006 | Brockway et al. | | 382/132 |
| 2007/0002047 A1* | 1/2007 | Desgranges et al. | | 345/426 |
| 2007/0008317 A1* | 1/2007 | Lundstrom | | 345/424 |
| 2007/0009078 A1* | 1/2007 | Saito | | G06T 11/008 |
| | | | | 378/4 |
| 2007/0040833 A1* | 2/2007 | Buyanovski | | G06T 15/06 |
| | | | | 345/426 |
| 2007/0043285 A1* | 2/2007 | Schwartz | | A61B 18/1492 |
| | | | | 600/407 |
| 2007/0046966 A1* | 3/2007 | Mussack | | G06T 1/20 |
| | | | | 358/1.13 |
| 2007/0110209 A1* | 5/2007 | Nishide | | A61B 6/032 |
| | | | | 378/4 |
| 2007/0127791 A1* | 6/2007 | Ernvik et al. | | 382/128 |
| 2007/0127845 A1* | 6/2007 | Fu | | G06T 7/0026 |
| | | | | 382/294 |
| 2007/0216909 A1* | 9/2007 | Everett | | A61B 5/0059 |
| | | | | 356/479 |
| 2007/0229500 A1* | 10/2007 | Engel | | G06T 15/08 |
| | | | | 345/422 |
| 2007/0248265 A1* | 10/2007 | Lundstrom et al. | | 382/168 |
| 2008/0025587 A1* | 1/2008 | Asbeck | | G06T 7/606 |
| | | | | 382/128 |
| 2008/0063248 A1* | 3/2008 | Young et al. | | 382/128 |
| 2008/0107318 A1* | 5/2008 | Kiraly | | 382/131 |
| 2008/0232661 A1* | 9/2008 | Habets | | G06T 7/0012 |
| | | | | 382/128 |
| 2009/0034684 A1* | 2/2009 | Bernard | | G06T 19/00 |
| | | | | 378/98 |
| 2009/0097731 A1* | 4/2009 | Sanada et al. | | 382/132 |
| 2009/0103793 A1* | 4/2009 | Borland et al. | | 382/131 |
| 2009/0213240 A1* | 8/2009 | Sim | | G06T 17/00 |
| | | | | 348/222.1 |
| 2009/0306511 A1* | 12/2009 | Yamagata | | A61B 8/0833 |
| | | | | 600/447 |
| 2010/0128954 A1* | 5/2010 | Ostrovsky-Berman et al. | | 382/131 |
| 2010/0142670 A1* | 6/2010 | Saito | | A61B 6/032 |
| | | | | 378/8 |
| 2010/0142788 A1* | 6/2010 | Matsumoto | | 382/131 |
| 2010/0201687 A1* | 8/2010 | Breeuwer et al. | | 345/424 |
| 2010/0246914 A1* | 9/2010 | Porikli et al. | | 382/131 |
| 2010/0316277 A1* | 12/2010 | Fan | | G06T 7/0028 |
| | | | | 382/131 |
| 2011/0090222 A1* | 4/2011 | Ibarz | | G06T 15/08 |
| | | | | 345/422 |
| 2011/0103665 A1* | 5/2011 | Gulsun | | G06T 7/2046 |
| | | | | 382/131 |
| 2012/0170832 A1* | 7/2012 | Liu | | G06T 7/0065 |
| | | | | 382/154 |
| 2012/0294510 A1* | 11/2012 | Zhang | | G06K 9/2036 |
| | | | | 382/154 |
| 2013/0293700 A1* | 11/2013 | Yang | | G01B 11/22 |
| | | | | 348/135 |
| 2015/0192681 A1* | 7/2015 | Cho | | G01T 1/161 |
| | | | | 250/366 |

OTHER PUBLICATIONS

Ferencik, M., et al.; Diagnostic Accuracy of Image Postprocessing Methods for the Detection of Coronary Artery Stenoses by Using Multidetector CT; 2007; Radiology; 243(3)696-702.

Raman, R., et al.; Curved-Slab Maximum Intensity Projection: Method and Evaluation; 2003; Radiology; 229(1) 255-260.

Ringl, H., et al.; The Skull Unfolded: A Cranial CT Visualization Algorithm for Fast and Easy Detection of Skull Fractures; 2010; Radiology; 225(2)553-562.

* cited by examiner

Figure 2:
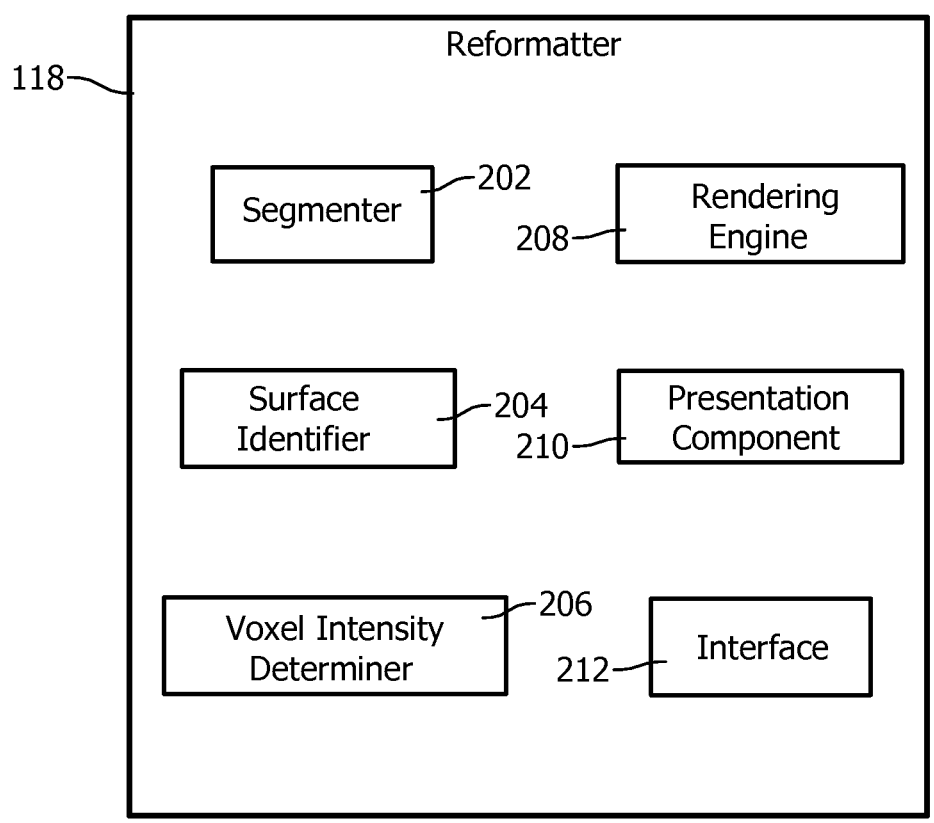
Figure 3A:
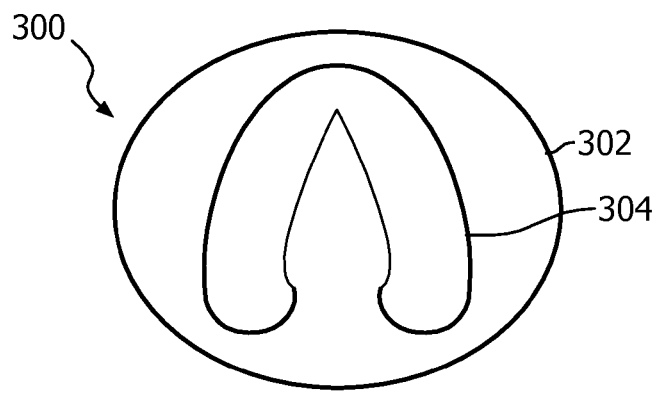
Figure 3B:
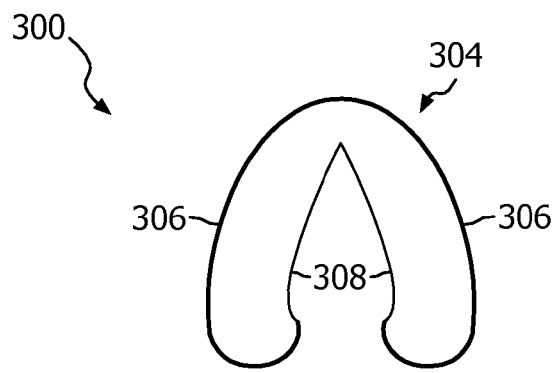
Figure 3C:
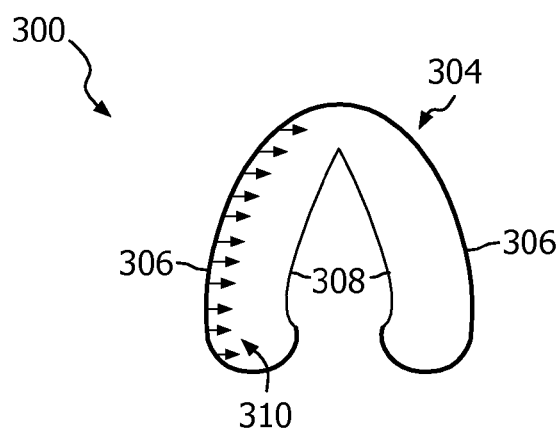
Figure 4A:
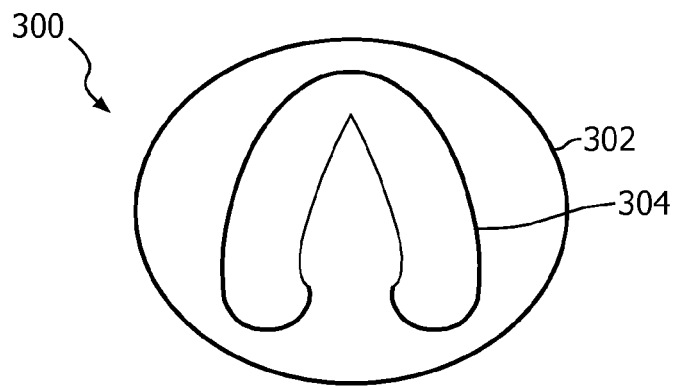
Figure 4B:
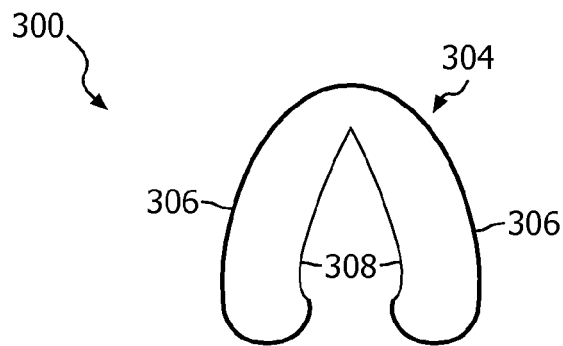
Figure 4C:
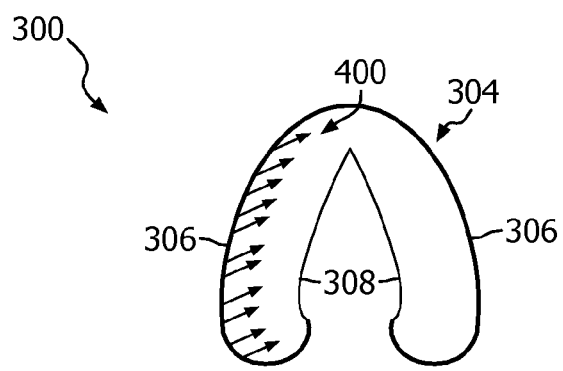
Figure 5:
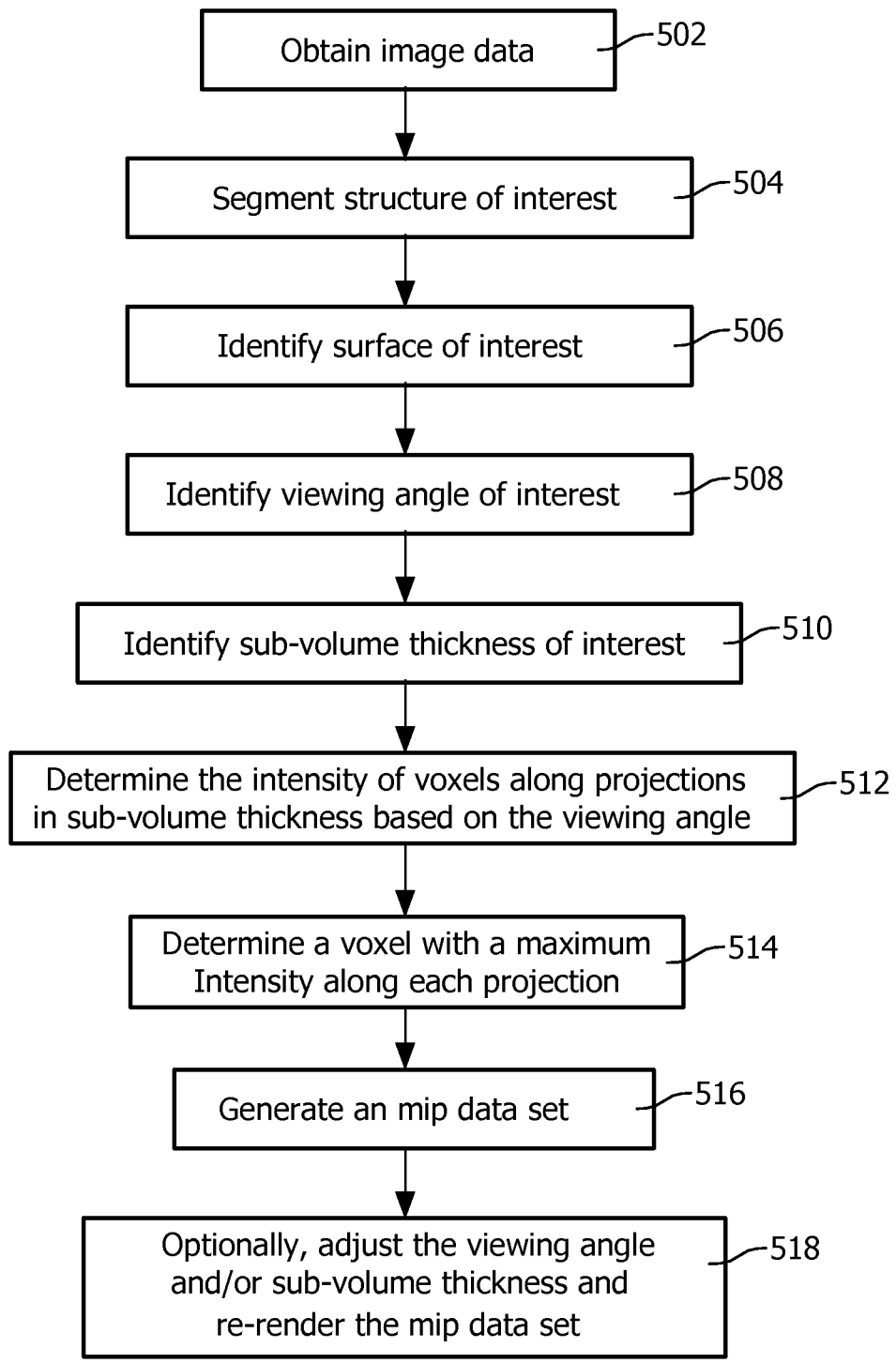

IMAGE DATA REFORMATTING
>
> ## CROSS REFERENCE TO RELATED APPLICATIONS
>
> This application claims the benefit of U.S. provisional application Ser. No. 61/324,809 filed Apr. 16, 2010, which is incorporated herein by reference.
>
> The following generally relates to reformatting image data and is described with particular application to computed tomography (CT); however, other imaging modalities such as magnetic resonance imaging (MRI), 3D x-ray, positron emission tomography (PET), single photon emission tomography (SPECT), ultrasound (US), and/or other imaging modalities are also contemplated herein.
>
> Diagnostic imaging (e.g., CT, MRI, 3D x-ray, PET, SPECT, US, etc.) has been used for visual inspection of the lungs, liver, and/or other tissue of interest to assess function, disease, progression, therapy success, etc. The volumetric image data generated thereby has been variously rendered and reformatted for visually enhancing tissue of interest and/or suppressing other tissue.
>
> One reformatting technique that has been used to visually enhance tissue of interest is maximum intensity projection (MIP). Generally, MIP is a visualization technique that projects, in the visualization plane, those voxels of the volumetric image data with maximum intensity that fall within rays traced from the viewing angle or viewpoint to the plane of projection through the image data.
>
> Unfortunately, with state of the art or conventional MIP for the lungs (and other tissue), reformatting the volumetric image data may render data that mainly shows the larger more central vessels of the structure of interest as the smaller peripheral vessels of the structure of interest may be hidden or occluded thereby. As a consequence, disease corresponding to the smaller peripheral vessels may not be readily apparent in the rendered reformatted volumetric image data.
>
> In view of at least the foregoing, there is an unresolved need for new and non-obvious techniques reformatting image data.
>
> Aspects of the present application address the above-referenced matters and others.
>
> According to one aspect, a method for reformatting image data includes obtaining volumetric image data indicative of an anatomical structure of interest, identifying a surface of interest of the anatomical structure of interest in the volumetric image data, identifying a thickness for a sub-volume of interest of the volumetric image data, shaping the sub-volume of interest such that at least one of its sides follows the surface of interest, and generating, via a processor, a maximum intensity projection (MIP) or direct volume rendering (DVR) based on the identified surface of interest and the shaped sub-volume of interest.
>
> According to another aspect, a reformatter includes a processor that generates at least one of maximum intensity projection (MIP) or direct volume rendering (DVR) for a sub-portion of an anatomical structure of interest based on an identified surface of interest of the anatomical structure of interest and an identified sub-volume of interest of the anatomical structure of interest, wherein the MIP or DVR is generated based on a side of the sub-portion that follows the surface of interest.
>
> According to another aspect, a computer readable storage medium encoded with instructions which, when executed by a computer, cause a processor of the computer to perform the step of: identifying a sub-volume of interest in an anatomical structure in volumetric image data, wherein the sub-volume of interest follows a surface of the anatomical structure, and generating at least one of a maximum intensity projection (MIP) or direct volume rendering (DVR) based on the identified sub-volume of interest.
>
> The invention may take form in various components and arrangements of components, and in various steps and arrangements of steps. The drawings are only for purposes of illustrating the preferred embodiments and are not to be construed as limiting the invention.
>
> FIG. 1 illustrates an imaging system in connection with an image data reformatter.
>
> FIG. 2 illustrates an example image data reformatter.
>
> FIGS. 3A-3C illustrate example image data reformatting viewing angle and sub-volume thickness.
>
> FIGS. 4A-4C illustrate example image data reformatting viewing angle and sub-volume thickness.
>
> FIG. 5 illustrates an example method for reformatting image data.
>
> FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis. A radiation source 108, such as an x-ray tube, is supported by the rotating gantry 104 and rotates with the rotating gantry 104, and emits radiation that traverses the examination region 106. A radiation sensitive detector array 110 detects radiation emitted by the radiation source 108 that traverses the examination region 106 and generates projection data indicative of the detected radiation.
>
> A reconstructor 112 reconstructs projection data and generates volumetric image data indicative of the examination region 106. A support 114, such as a couch, supports the object or subject in the examination region 106. The support 114 is movable along the x, y, and z-axis directions. A general purpose computing system serves as an operator console 116, which includes human readable output devices such as a display and/or printer and input devices such as a keyboard and/or mouse. Software resident on the console 116 allows the operator to control the operation of the system 100, for example, by allowing the operator to select a motion compensation protocol, initiate scanning, etc.
>
> A reformatter 118 reformats image data, for example, from the imaging system 100 and/or one or more other systems. The illustrated reformatter 118 is configured to reformat image data at least in connection with one or more anatomical surfaces of interest of one or more anatomical structures (e.g., lung, liver, etc.) of interest represented in the volumetric image data. In one instance, this includes reformatting image data so as to adapt the image data to a shape of a surface of interest of an anatomical structure of interest. The shape of the surface of interest may be planar (straight) or curved. The image data may be the entire image data or a sub-portion thereof, for example, segmented image data or other sub-portion of image data.
>
> As described in greater detail below, the reformatter 118 can determine information about the voxels in the volumetric image data and variously reformat the image data based thereon. This includes determining information for one or more predetermined depths or thicknesses of image data, for example, relative to a reference region such as to a surface of interest. By way of example, the reformatter 118 can determine intensities of voxels along projections through a predetermined region and generate a MIP (maximum intensity projection) data set in which a voxel with a maximum intensity along each projection is projected in the visualization plane traced from a viewing angle or viewpoint to the plane.

With respect to lung, liver, etc. studies, the foregoing allows for generating MIP projection data well-suited for visualizing the smaller peripheral or distal vessels nearer the surface of the lung, liver, etc., while mitigating occlusion of the smaller peripheral vessels by the larger more central or proximal vessels that are relatively farther away from the surface of the lung, liver, etc. This allows for visually enhancing the smaller peripheral vessels for improved inspection of the peripheral vessels and health thereof, relative to conventional MIP. This also allows for viewing of the lobar and segmental structure of lung, liver, etc. without using explicit lobar segmentation, which might be prone to errors.

The foregoing reformatting approach also provides a computationally inexpensive approach for visualizing the smaller distal vessels of lung, liver, etc. Other suitable reformattting includes, but not limited to, producing, 2D, 3D, 4D, MPR, minimum intensity projection (mIP), etc. In addition, the reformatter 118 may include a reconstructor that reconstructs projection data and/or can otherwise process projection data.

It is to be appreciated that the reformatter 118 may be part of or integrated with a computing device (e.g., a computer) having one or more processors that execute one or more instructions encoded or stored on computer readable storage medium to implement the functions thereof. For example, in one instance, the reformatter 118 is part of the console 116. In yet another instance, the reformatter 118 resides in a computing device remotely located from the imaging apparatus 100 such as a workstation, computer, etc.

Although the above is describe in connection with CT data, it is to be understood that other imaging data such as MRI, radiography, PET, SPECT, US, and/or other imaging data can be reformatted by the reformatter 118.

FIG. 2 illustrates an example reformatter 118.

A segmenter 202 can be used to segment anatomical structure(s) of interest (e.g., an individual lung lobe, both lung lobes together, the liver, etc.) in the volumetric image data. The segmenter 202 can employ various segmentation techniques. For example, in one instance, an automated approach is used. The automated approach may be based on a grey level, an anatomical model, and/or other information.

In one embodiment, a user provides an input indicative of the structure of interest to the segmenter 202 such as by selecting a button or other indicia (corresponding to the structure of interest) of a graphical user interface, entering data via a keyboard/pad, or otherwise. The segmenter 202 then automatically segments the structure of interest. A user may adjust the automated segmentation, for example, by re-shaping or otherwise adjusting the segmentation.

In another embodiment, the user manually identifies the structure of interest in the image data. This may include the user using a mouse, a free hand draw tool, an adjustable predefined geometrical object to determine a perimeter or otherwise identify the structure of interest in the image data, etc. In another embodiment, the segmenter 202 is omitted. In this instance, the reformatter 118 may process already segmented image data or image data that has not been segmented.

A surface identifier 204 identifies a surface(s) of the structure of interest in the segmented data. Likewise, automated and/or manual techniques can be used. By way of example, an anatomical model, a gradient, and/or other information can be used to automatically identify surfaces and/or user input can identify surfaces. The surface identifier 204 may identify an outer or peripheral surface, an inner or central surface, or a surface therebetween.

A voxel intensity determiner 206 identifies voxel intensities along projections through or into the segmented data. The illustrated intensity determiner 206 identifies voxel intensities based on various input. By way of example, the input may identify a viewing angle for the projections. The viewing angle can be located with respect to the projection plane such that the projections are substantially perpendicular or normal to the projection plane. In another instance, the viewing angle can be located such that the projections are oblique or parallel to the projection plane. The viewing angle can be a default, user defined, or other viewing angle.

Additionally or alternatively, the input may identify a sub-volume thickness or depth for the projections. For example, the input may indicate that one or more projections extend 0.5 millimeters (mm), 1.0 mm, 10.0 mm, 25 mm, or other depth from the identified surface (or other region of the segmented structure) into the segmented structure. In one embodiment, the sub-volume thickness or depth is uniform along the surface. In another embodiment, the sub-volume thickness or depth may vary along the surface.

Additionally or alternatively, the illustrated intensity determiner 206 may identify voxel intensities based on other information. In one embodiment, the viewing angle, sub-volume thickness, and/or other information is determined via a machine learning approach based on an implicitly and/or explicitly trained classifier, probabilities, neural networks, support vector machines, cost functions, statistics, heuristics, history, or the like.

A rendering engine 208 renders the segmented data based on the identified surface, viewing angle, thickness, etc. A presentation component 210 allows for a visual presentation of the rendered image data.

An interface 212 allows a user to interact with the reformatter 118. Such interaction may include entering various information such as at least one or more of a tissue of interest, a surface of interest, a view angle of interest, and a sub-volume thickness of interest. Such information includes pre and post reformatting information. When provided after reformatting, the image data can be reformatted again based on the latest information. This allows a user to tweak or fine turn various parameters for visualization purposes.

FIG. 3 provides an example based on a lung study. FIG. 3A shows volumetric image data 300, including the lungs 304 and other anatomy 302, prior to segmentation. FIG. 3B illustrates the image data 300 with the lungs 304 after they are segmented therefrom, including an outer peripheral surface 306 and an inner central surface 308. In FIG. 3C, indicia 310, showing a first MIP viewing angle and sub-volume thickness with respect to the outer peripheral surface 308, are superimposed over the segmented data for illustrative purposes.

FIG. 4 provides another example based on a lung study. FIG. 4A shows the volumetric image data 300, including the lungs 304 and the other anatomy 302, prior to segmentation. FIG. 4B illustrates the image data 300 with the lungs 304 after they are segmented therefrom, including the outer peripheral surface 306 and the inner central surface 308. In FIG. 4C, indicia 400, showing a second MIP viewing angle and sub-volume thickness from the outer peripheral surface 306, are superimposed over the segmented data for illustrative purposes.

Note in FIG. 4C that the viewing angles and the thickness are different than those in FIG. 3C. In other embodiment, the viewing angles may be the same and the sub-volume thickness may be different. In other embodiment, the sub-volume thickness may be the same and the viewing angles may be different. In other embodiment, different viewing angles and/or sub-volume thickness are utilized.

FIG. 5 illustrates a method for reformatting image data.

At 502, image data is obtained. As described herein, suitable image data includes, but is not limited to, data generated by one or more of a CT, MRI, radiography, PET, SPECT, US, etc. imaging modality.

At 504, the image data is segmented based on an anatomical structure of interest such as the lungs, liver, etc. The segmentation may include the entire anatomical structure (e.g., the whole lung) or a sub-portion thereof (e.g., the right lobe to the lung, the left lobe of the lung, or another sub-portion of the lung), and may be performed manually, automatically, or semi-automatically.

At 506, one or more surfaces of interest of the structure are identified. As described herein, the surface may be the surface of a lung, the liver, etc. with relatively smaller vessels such as the peripheral vessels of the lunch, the liver, etc., and/or other vessels. Suitable surfaces include curved (curvilinear) surfaces and flat surfaces.

At 508, a viewing angle for the projections lines is identified. As described herein, the viewing angle may be generally perpendicular or oblique to a viewing plane.

At 510, a sub-volume thickness of the segmented image data to be processed is identified.

At 512, an intensity of the voxels along each of the projection lines is determined As described herein, the projections may begin at the identified surface and extend through the identified thickness. In other embodiments, other starting points and/or distances are contemplated.

At 514, the voxel with the maximum intensity along each projection line is identified. In one instance, this includes casting rays from the surface into the structure through the thickness and determining a maximum intensity projection of the voxels along each ray.

At 516, a MIP image data set is rendered based on the identified voxels. The data can be presented in axial, sagittal, and/or coronal viewing direction.

At 518, optionally, a user adjusts one or more parameters such as the viewing angle and/or sub-volume thickness, and the acts 508 to 514 are repeated. In one instance, this includes dynamically updating the presented image data based on the viewing angle and/or sub-volume thickness. Furthermore, multiple renderings based on different viewing angle and/or sub-volume thickness data can be concurrently and/or individually presented.

As described herein, the foregoing allows for generating MIP projection data well-suited for visualizing the smaller distal vessels nearer the surface of anatomical structure such as the lung, liver, etc., while mitigating occlusion of the smaller distal vessels by the larger proximal vessels which generally are located relatively farther away from the distal surface. This provides for improved inspection of the distal vessels, relative to conventional MIP, and a computationally inexpensive approach for visualizing the smaller distal vessels.

In another embodiment, the segmenter 202 (or other component) additionally or alternatively generates a direct volume rendering (DVR). In one instance, this approach is applied to slabs or volumes of interest in the same way as MIPs. With this rendering approach, the volume rendering does not rely on any explicit surface segmentation, but directly converts the gray-values in the volume of interest into a projection image, for example, by an opacity transfer function (OTF) or otherwise, instead of using the maximum intensity principle.

The above acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A method for reformatting image data, comprising:
   obtaining volumetric image data indicative of an anatomical structure of interest;
   receiving a first user input identifying a surface of interest of the anatomical structure of interest in the volumetric image data;
   receiving a second user input providing a thickness of interest for a sub-volume of the anatomical structure of interest, wherein the thickness includes a first depth for a first projection of the sub-volume and a second depth for a second projection of the sub-volume, wherein the first and second projections are different projections, and the first and second depths are different depths;
   shaping the sub-volume such that at least one of its sides follows the surface of interest; and
   generating, via a processor, a maximum intensity projection (MIP) or direct volume rendering (DVR) beginning at the surface of interest and extending into the anatomical structure of interest of a distance to the provided thickness, wherein the first projection extends from the surface to the first depth in the MIP or DVR, and the second projection extends from the surface to the second depth in the MIP or DVR.

2. The method of claim 1, further comprising:
   adjusting the thickness of interest; and
   updating the MIP or DVR based on the adjusted thickness.

3. The method of claim 1, further comprising:
   identifying a viewing angle of interest for the anatomical structure of interest; and
   generating the MIP or DVR based on the sub-volume and the viewing angle of interest.

4. The method of claim 3, further comprising:
   adjusting the viewing angle of interest; and
   updating the MIP or DVR based on the adjusted view angle of interest.

5. The method of claim 1, wherein the structure of interest includes at least one other surface, wherein a set of vessels of interest is located nearer the surface of interest relative to the at least one other surface.

6. The method of claim 5, wherein the set of vessels include smaller peripheral vessels and larger central vessel are located nearer the at least one other surface.

7. The method of claim 6, wherein the thickness includes the smaller peripheral vessels and not the larger central vessel.

8. The method of claim 1, wherein the surface of interest is a curved surface.

9. A reformatter, comprising:
a processor that generates at least one of a maximum intensity projection (MIP) or direct volume rendering (DVR) for a sub-portion of an anatomical structure of interest from volumetric image data indicative of the anatomical structure of interest based on a surface of interest of the anatomical structure of interest identified in the volumetric image data through a first input and a thickness of a sub-volume of the anatomical structure provided by a second input, wherein the thickness includes a first depth for a first projection of the sub-volume and a second depth for a second projection of the sub-volume, the first and second projections are different projections, the first and second depths are different depths, the MIP or DVR is generated beginning at the surface of interest and extending into the anatomical structure of interest to the provided thickness, and the first projection extends from the surface to the first depth in the MIP or DVR, and the second projection extends from the surface to the second depth in the MIP or DVR.

10. The reformatter of claim 9, wherein the processor generates the MIP or DVR based on a region of data defined by the surface of interest and the sub-volume of interest.

11. The reformatter of claim 9, wherein the processor generates the MIP or DVR based on a viewing angle of interest.

12. The reformatter of claim 11, wherein the viewing angle is generally perpendicular to a projection plane.

13. The reformatter of claim 11, wherein the viewing angle is oblique to a projection plane.

14. The reformatter of claim 9, further comprising:
a segmentor that segments the anatomical structure of interest from volumetric image data.

15. The reformatter of claim 9, further comprising:
an interface for receiving a signal indicative of a change of a thickness of the sub-volume of interest, wherein the processor updates the MIP or DVR based on the signal.

16. The reformatter of claim 9, wherein the anatomical structure of interest includes a first set of vessels of interest and a second set of vessels, and the first set of vessels of interest are located nearer to the surface of interest than the second set of vessels.

17. The reformatter of claim 16, wherein the sub-volume of interest includes a substantial portion of the first set of vessels of interest.

18. A non-transitory computer readable storage medium encoded with instructions which, when executed by a processor of a computer, cause the computer to perform the step of:
obtain volumetric image data indicative of an anatomical structure of interest;
receive a first user input identifying a surface of interest of the anatomical structure of interest in the volumetric image data;
receive a second user input providing a thickness of interest for a sub-volume of the anatomical structure of interest, wherein the thickness includes a first depth for a first projection of the sib-volume and a second depth for a second projection of the sub-volume, the first and second projections are different projections, and the first and second depths are different depths;
shape the sub-volume such that at least one of its sides follows the surface of interest; and
generate a maximum intensity projection (MIP) or direct volume rendering (DVR) beginning at the curved surface of interest and extending into the anatomical structure of interest to the provided thickness, wherein the first projection extends from the surface to the first depth in the MIP or DVR, and the second projection extends from the surface to the second depth in the MIP or DVR.

* * * * *